E. A. SPERRY.
SHIP STABILIZING AND ROLLING APPARATUS.
APPLICATION FILED JAN. 6, 1915.

1,232,619.

Patented July 10, 1917.
2 SHEETS—SHEET 1.

WITNESSES:

INVENTOR.
ELMER A. SPERRY
BY
Herbert H. Thompson,
ATTORNEY.

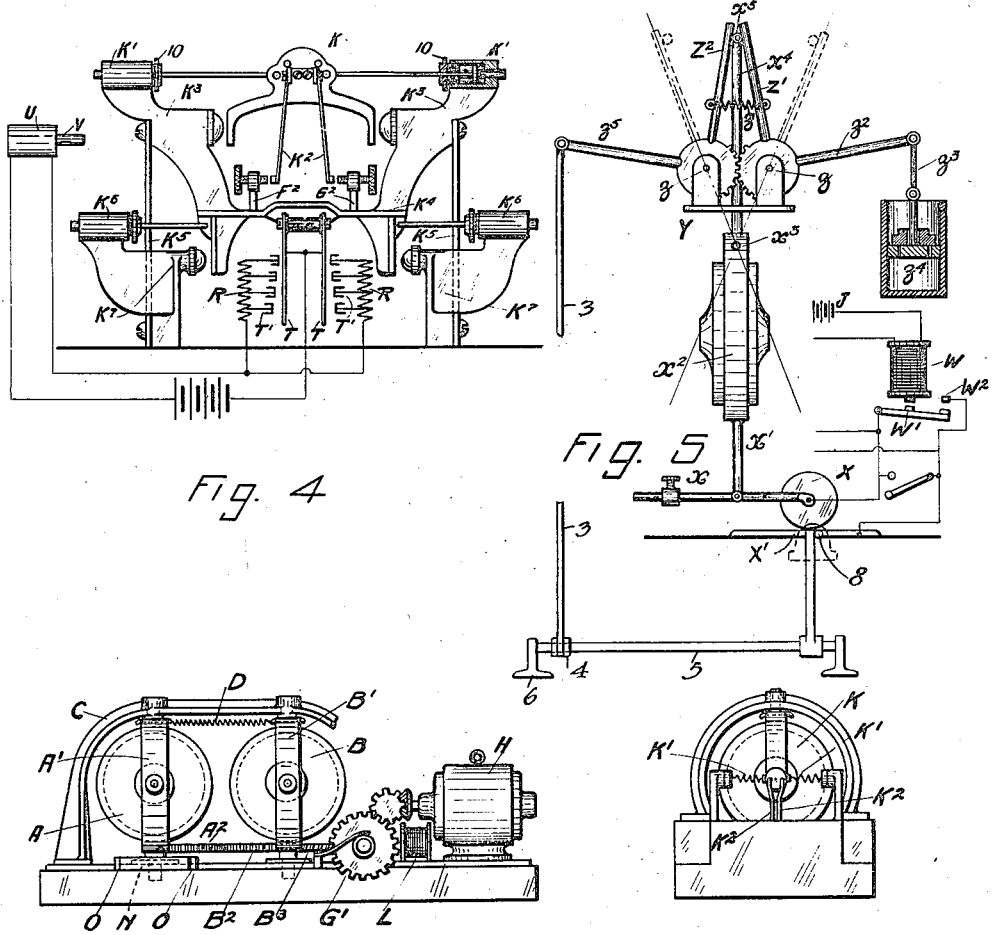

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

SHIP STABILIZING AND ROLLING APPARATUS.

1,232,619.   Specification of Letters Patent.   Patented July 10, 1917.

Application filed January 6, 1915. Serial No. 716.

*To all whom it may concern:*

Be it known that I, ELMER A. SPERRY, a citizen of the United States of America, residing at Brooklyn, in the county of Kings, State of New York, have invented certain new and useful Improvements in Ship Stabilizing and Rolling Apparatus, of which the following is a specification.

This invention relates to stabilizing or rolling apparatus for ships and other oscillatory bodies and has particular reference to the control of gyroscopic stabilizing apparatus so constructed and arranged that angular displacements of the ship bring about the control of an engine or motor which applies torques or imparts angular motion to one or more gyroscopes, the impressed angular motion being of a precessional character so that the gyroscope transmits through its frame a stabilizing force upon the ship. An example of this kind of apparatus is shown in my patent on ships' gyroscopes 1,150,311, August 17th, 1915.

According to the present invention the precession engine or motor, or its electromagnetic clutch mechanism or other device whereby power is transmitted to the stabilizing gyroscopes to impress precessional movements upon them, is automatically controlled by means acting responsively to the angular velocity of the ship's movements with respect to the axis about which stabilization is to be effected.

According to my invention, I make use of an auxiliary gyroscope to control the main gyroscopes or other means for applying periodic rolling torques to the ship. The main gyroscope may be controlled through a precession engine or other means for applying torques thereon by the variations which take place between the position of the auxiliary gyroscope and fixed points on the ship. By such means a highly sensitive control is effected, which is responsive to an incipient roll of the ship.

Further objects of my invention are to so construct the device that it may be readily used for rolling a ship to enable it to break ice or work its way off a sand bank, to provide against damage to the apparatus by excessive or unusual rolling of the ship; and to provide means whereby, during heavy rolling, the stabilizing effect of the apparatus is applied only at the period of maximum velocity of roll, whereby the maximum stabilizing effect is secured with a minimum displacement of the stabilizing gyroscope or gyroscopes.

Other objects of the invention will appear as I proceed to describe a specific embodiment of my invention, shown in the accompanying drawings.

Referring, now, to the drawings:

Fig. 2 is a side elevation of the stabilizing gyroscopes.

Fig. 3 is a partly diagrammatic face view of the master or controlling gyroscope.

Fig. 4 is a detailed end elevation of the preferred mounting for the master gyroscope, showing the means actuated by said gyroscope for regulating the brake mechanism coöperating with the stabilizing gyroscopes.

Fig. 5 is a diagrammatic view of the means employed to control the period of activity of the stabilizing gyroscopes.

Fig. 6 is a plan view of a detail.

Fig. 7 is a detail, being a section on line 7—7 of Fig. 5.

Figure 1:
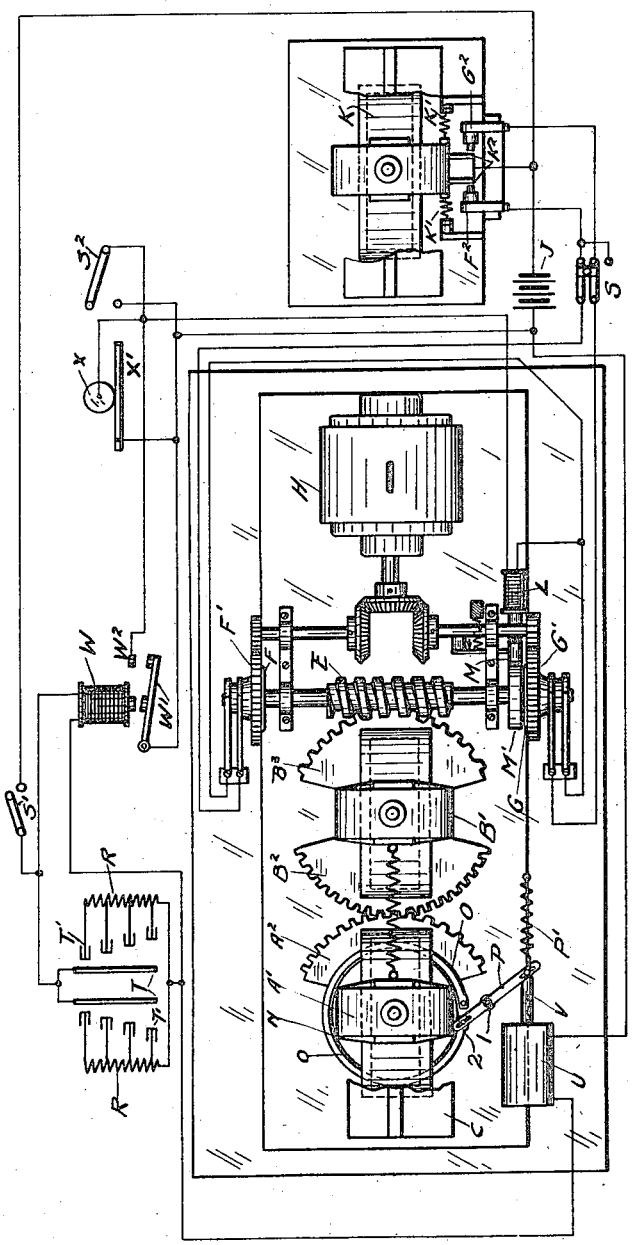
Figure 1 is a plan view of a pair of stabilizing gyroscopes with novel form of control applied, showing the master gyroscope for governing the precession engine and the precession engine. Parts of the auxiliary apparatus are shown diagrammatically.

For exerting rolling torques on the ship I prefer to employ one or more gyroscopes. The so-called rolling torques exerted by these gyroscopes are so applied as to oppose the rolling of the ship when the gyroscopes are stabilizing the ship, and to increase the roll of the ship when the gyroscopes are used to roll the ship. In other words, the gyroscopes exert similar torques in the two instances, but the synchronism between the torques and the roll of the ship is reversed in the two instances. In this embodiment of the invention two stabilizing gyroscopes are shown, comprising two casings A—B containing spinning rotors or gyro wheels which are kept in constant rotation in any manner, preferably by acting as rotors of induction motors. The casings A—B are mounted rotatably about parallel vertical axes in a common frame C secured to the ship. The spinning axis of the gyro wheels is normally athwartships, and the casings may or may not be connected together by a centralizing spring D. The pivoted frames A' B' in which the casings A B are carried are provided with inter-engaging segments $A^2$ $B^2$ respectively and the frame B' is also provided with a second toothed segment $B^3$ for engagement with a worm shaft E. The worm shaft is normally idle, but clutches F G are adapted to temporarily secure it to power-driven toothed wheels F' G'. The toothed wheels F' G' are shown as being rotated in opposite directions through spur and bevel gearing from an electric motor H, so that if the clutch G locks the worm shaft to the wheel G' the worm shaft is rotated in one direction while clutch F secures rotation in the other direction. S, S' and $S^2$ are three switches hereinafter referred to. In the particular constructional arrangement shown, the clutches F and G are electromagnetic and the current for energizing the one or the other of them is supplied from a source J through one or other of two circuits which are completed by means responsive to the rolling movements of the ship. Hence when the ship commences to roll to one side, the switch S being closed in the upper position shown the switch S' being open and the switch $S^2$ being closed, one of the clutches is energized and forced precession is imparted to the two gyroscope casings A and B in such a way that stresses are transmitted through the frame C to suppress or neutralize the rolling motion, and when the ship commences to roll to the other side, the other clutch is energized and the forced precession of the gyroscopes is in the opposite sense, thereby causing stresses to again suppress or neutralize the rolling motion.

The worm and worm wheel construction for applying precessional forces on the gyroscopes possesses especial advantages in this particular construction. It not only is of use in applying of powerful accelerating torques about the precession axis, but automatically becomes a powerful brake or stop, when the motor is cut out as hereinafter explained, since, as is well known, whenever attempt is made to drive a worm from a worm wheel the frictional losses are very great so that a powerful braking effect is produced. This effect is of course dependent somewhat upon the pitch of the worm, being so great with worms of small pitch such as shown in Fig. 1 as to act as a lock. In order to assist this braking effect I prefer to employ an electrically controlled brake M on the worm shaft, the details of which are hereinafter described.

The means shown in Figs. 1 and 2 for energizing one or other of the clutches responsively to the rolling motion of the ship comprise an independent gyroscope K mounted with its precessional axis vertical and its spinning axis athwartships, in which position it is normally held by adjustable centralizing springs K' K'. An incipient roll of the ship causes the casing of the gyroscope K to turn about its vertical axis and thereby close the circuit of one or the other of the clutches F or G by contact of one or other of two springs $K^2$ $K^2$ with one or other of two contacts $F^2$ $G^2$. The gyroscope K is highly responsive in its precessional function to angular velocity of the ship's rolling movements, and a very small angular velocity, such as corresponds to an incipient roll, brings about actuation of the stabilizing gyroscopes, thus insuring very close stabilization. The degree of sensitiveness of the gyroscope K or the value of the angular velocity at which the gyroscope operates to close one or other of the clutch circuits can be regulated by adjusting the centralizing springs K' K', by turning the threaded caps 10.

So long as the gyroscope K is in its centralized position the clutch circuits are broken, and since an electromagnet L is included in these circuits this electromagnet remains unexcited. The electromagnet L is adapted to coöperate with a spring-controlled brake shoe M which normally presses against a collar M' on the worm shaft E. When however the circuit of either of the clutches F or G is closed, the electro-magnet L is energized and the brake shoe M is attracted away from the collar M' thus permitting the worm shaft E to be driven by the excited clutch. Immediately, however, the clutch is deënergized, the electromagnet L also becomes deënergized and the brake shoe M returns into engagement with the collar M', thus arresting the rotation of the worm shaft and thereby promptly stopping the forced precession of the stabilizing gyroscopes.

It may be here explained that if the switch S is thrown into its lower position, the electrical connections of the clutches F and G being thereby reversed the reverse of the above described action takes place, namely any rolling motion of the ship serves to energize the opposite clutch and to impress forces upon the ship which produce further rolling, at the end of which, when the ship starts to roll back or oppositely, the opposite contact is closed and the other clutch is energized and the forced precession of the gyroscopes is reversed, thereby again causing increased roll in a direction opposite to the first, and so on back and forth, always automatically in strict step with a natural period of the ship, until the friction of the ship, due to her form-line resistance, balances the rolling increments received from the gyroscopes, whereupon no further increase in rolling amplitude takes place, but the ship rolls on and on continuously. It will be understood that forced rolling of a ship is advantageous in some cases as for example, for breaking through ice or for working off a sandbank.

In connection with stabilizing gyroscopes on ships, I find it preferable to provide a brake or stop device to control the gyroscope in the event it is unable to prevent an excessive rolling of the ship. Without such a device, the gyroscopes would precess about their vertical axes until their spinning axes would turn into the fore and aft line of the ship, in which position they would exert no stabilizing effect on the ship, and would become ungovernable. One form of braking apparatus is shown in the accompanying drawings. Referring in particular to Fig. 4 in conjunction with Figs. 1 and 2 it will be noticed that as soon as either of the circuits through the contacts $F^2$ $G^2$ is completed, further angular movement of the controlling gyroscope K is initially arrested by abutments $K^3$ $K^3$. These abutments form part of a swinging frame $K^4$, which carries the aforesaid contacts $F^2$, $G^2$, and is suitably mounted for movement, as by the parallel springs $K^5$ $K^5$. The frame $K^4$ is, however, centralized by springs $K^6$, which are stronger than the springs $K'$ and therefore hold the frame $K^4$ in the position shown on the drawings until the angular velocity of the ship becomes so high as to give rise to forces sufficient to overcome these springs $K^6$, which then yield and move with the gyroscope K in one or other direction until finally arrested by stops $K^7$ secured to the base or support of the apparatus. During the lateral excursion of the frame $K^4$, however, contacts T are made to engage a series of resilient contacts $T'$, each a little farther removed from the contact T than the one before. These contacts are so connected that, assuming the switches $S'$ $S^2$ to be closed, a variable current will flow through a magnetically controlled brake mechanism, represented by the solenoid U (Figs. 1 and 4). One method of accomplishing this is by using rheostats R and coupling the contacts in at various points along the resistance. When the angular velocity is great enough for the controlling gyroscope to overcome not only the centralizing springs $K^6$ but also the upper three of the resilient contacts $T'$, then a circuit is completed by way of the switch $S'$ and the lower resilient contact $T'$ and the current is then at full strength and flows directly from the source of supply J to the solenoid U and back to the source, as will be seen from the drawing. Under these conditions a brake band O (Figs. 1 and 2) is fully applied with its maximum pressure to a brake drum N, a solenoid core V pulling a brake lever P to its full extent over to the left against a retractile spring $P'$. Lever P is shown as pivoted at 1 and linked adjacent its inner end to the end 2 of the brake band. It will be readily understood that when the intermediate contacts $T'$ are engaged, the pull of the solenoid and consequently the force with which the brake is applied is partial, or fractional, or proportional to the number of contacts $T'$ in engagement with the moving contact T. It will thus be seen that the brake band O, tending to hold and control the precessional motion of the main gyroscopes, is never applied until excessive angular velocities of the ship due to excessive roll arise and then is applied to a greater or less extent in proportion as this angular velocity increases or decreases. Thus the precessional motion of the gyroscopes is controlled by means additional to the motor H, which means act proportionately, not to the angular velocity of the gyroscopes, but, as stated, to the angular velocity of the vessel to which the gyroscopes are attached, thereby providing an additional safeguard against excessive precessional velocities of the gyroscopes at times when the ship is not being held absolutely, or practically, free from rolling motion by the gyroscopes.

I will now describe how excessive roll of the ship may be dealt with effectively by confining the periods of activity of the gyroscopes closely to the periods of maximum velocity of roll of the ship. Referring in particular to Figs. 5 and 6, in conjunction with Fig. 2, assume that the switch $S'$ is open and the switch $S^2$ is open also. It is seen that the circuit of the battery J and clutches F and G is by way of a roller X and a wedge-shaped plate $X'$. The roller X is carried by a counterbalanced arm $x^2$ being pivoted on horizontal trunnions $x^3$ and provided with an upwardly extending arm $x^4$ carrying a lateral pin or roller $x^5$ normally embraced by the upright arms of two bent levers $Z'$ $Z^2$ pivoted at $z$ $z$ and drawn together by a spring $z'$. The said levers are formed with interengaging toothed segments so that movement of one lever automatically causes equal and oppositely directed movement of the other. The lever $Z'$ is formed with an arm $z^2$ connected by a link $z^3$ with a dash pot $z^4$, and the lever $Z^2$ is formed with an arm $z^5$ connected by any suitable link mechanism with the wedge-shaped plate $X'$ in such a manner that a downward angular movement of the arm $z^5$ causes the link mechanism to thrust the plate transversely beneath the roller X in the direction indicated by the arrow in Fig. 6. This linkage may comprise a lever 3 pivoted adjacent one end to arm $z^5$ and adjacent its other end to a forked arm 4 which is secured to a shaft 5 rotatably mounted in bearings 6. Also secured to shaft 5 is a second arm 7 at right angles to arm 4, which is pivotally secured to rod 8 on plate X'. It will be readily seen that the longitudinal movement of lever 3 will rock arm 7 and move rod 8 through its bearings 9 carrying with it plate x.

It will be understood from the foregoing description that when the ship rolls, the relative to and fro movements between the ship and the pendulum cause the roller X to run to and fro across the surface of the plate X', and also cause the pin to thrust the two arms $Z'$ $Z^2$ outward alternately. These arms simultaneously spread apart in opposition to the spring $z'$; the link mechanism attached to the arm $z^5$ then moves the plate X' beneath the roller X, and the return movements of the parts to their normal position is retarded by the dash pot $z^4$. The operation of the parts is as follows:—

So long as the stabilizing gyroscopes are able to suppress rolling of the ship in its incipient stage, relative movements between the roller X and the plate X' have no effect upon the supply of current from the battery to the electro-magnetic clutches, because the relative movement is not sufficient to cause the roller to run off the plate. When however the stabilizing gyroscopes are unable to suppress roll of the ship in its incipient stages owing to persistent excessive wave impulses, it will be understood that each oscillation of the ship beyond a predetermined amount represented by the width of the plate X' at the portion traversed by the roller X on the plate X' causes the roller to run off the plate and thereby break the circuit of the electromagnetic clutches F or G thereby preventing the power of the precession engine from being transmitted to the stabilizing gyroscopes while the ship is passing through the excess portions of its oscillations. As soon, however, as the ship, on oscillating back toward its normal or "even-keel" position, arrives within a predetermined distance of this position, the roller X again makes contact with the plate X' and the circuit of the respective electromagnetic clutch is closed, with the result that the power of the precession motor is transmitted to the stabilizing gyroscopes and the latter therefore receive their precessional movements and exert their gyroscopic reaction at periods when their stabilizing effect upon the ship is greatest. Moreover it will be understood that the greater the excessive roll of the ship and therefore the greater the need for effective stabilization, the shorter becomes the path between the roller X and the plate X', because, as hereinbefore explained, the plate is shifted beneath the roller to an extent proportional to the amplitude of oscillation of the ship. The longitudinal adjustment of the plate X' in proportion to the amplitude of oscillation of the ship causes the period of activity of the stabilizing gyroscopes to be regulated accordingly; the greater the amplitude of oscillation of the ship, the more nearly is the period of activity of the stabilizing gyroscopes confined to the instant of maximum velocity of the ship, and in consequence the more intense is the stabilizing force exerted, which is the result desired.

In some cases it may be advantageous to employ the brake mechanism as described with reference to Figs. 2 and 4 in addition to the arrangement first described with reference to Figs. 2, 5 and 6. In such cases the switch S' is closed and the switch $S^2$ is opened, and an electromagnet W is provided for normally attracting a pivoted armature W' against a stop $W^2$ and thereby keeping a short circuit closed around the roller X and plate X' as shown clearly in Fig. 2. The winding of the electromagnet W is in shunt upon the contacts T T, and it will therefore be understood that when, owing to excessive roll of the ship, the resistance R is gradually cut out of circuit the proportion of the current passing through the electromagnet winding gradually decreases, thereby decreasing its attractive power on the armature W'. Hence so long as the strength of the current flowing to the solenoid U does not exceed a predetermined value the armature W' remains attracted and the roller X and plate X' are kept out of effective action by being short circuited, but at a predetermined increase of strength of the current flowing to the said solenoid U, the electro-magnet W is so weakened that the armature W' moves away from the contact $W^2$, and the roller X and plate X' are thereby thrown into action to limit the periods of activity of the gyroscopes as already described.

Although the device for controlling the precession engine or motor has usually been referred to as a gyroscope (K) it will be understood that the controlling device need not be gyroscopic in its operation provided it is responsive to the rolling movements of the ship.

It will also be understood that although the gyroscopes have been referred to chiefly as exerting a stabilizing influence upon the rolling movements of a ship, they can equally well be utilized to impart rolling movements to the ship, as already pointed out.

The peculiar adaptability of the mechanism shown in Figs. 5 and 6 to rolling a ship should also be noted. By means of this apparatus, after the ship is once started to roll well, the rolling may be maintained with little expenditure of energy as the precession engine will be actuated at only brief intervals of time at the period of maximum rolling effect. The action of the apparatus would be comparable to a person in a swing who is given a push each time he passes the vertical position.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having now particularly described and ascertained the nature of my said invention and in what manner the same is to be performed, I declare that what I claim is:—

1. A stabilizing device for ships and other devices subject to similar oscillations comprising a gyroscope, and means brought into action by precession of the gyroscope for exerting a stabilizing effect upon the ship.

2. A stabilizing device for ships and other devices subject to similar oscillations comprising a gyroscope and means brought into action by the precession of the gyroscope caused by a tendency of the ship to roll for exerting a force on the ship opposed to said rolling tendency.

3. A rolling device for ships comprising a gyroscope mounted on the ship, and means responsive to relative movement between the ship and gyroscope for exerting a rocking or oscillating movement to the ship.

4. A rolling device for ships comprising a gyroscope mounted on the ship, and means responsive to relative movement between the ship and gyroscope for exerting a rocking or oscillating movement to the ship at intervals corresponding to the period of roll of the ship.

5. A rolling device for ships comprising a gyroscope mounted on the ship, and means responsive to precession of the gyroscope caused by a tendency of the ship to roll for exerting a rocking or oscillating movement in the direction of said rolling tendency.

6. In a gyroscopic apparatus for ships, a gyroscope mounted on the ship so that rolling of the ship will cause precession of the gyroscope, a second gyroscope mounted on the ship, and means responsive to the precession of said first gyroscope for controlling said second gyroscope.

7. The combination with a body subject to oscillations, of a gyroscope mounted thereon so that oscillation of said body causes precession of said gyroscope, yielding means for opposing said precession, a torque applying device, and means responsive to said precession for bringing into action said device.

8. The combination with a body subject to oscillations, of a gyroscope mounted thereon so that oscillation of said body causes precession of said gyroscope, yielding means for opposing said precession, a torque applying device, means responsive to said precession for bringing into action said device, and means whereby the relation between said gyroscope and said device may be reversed.

9. The combination with a body subject to oscillations, of a gyroscope mounted thereon so that oscillation of said body causes precession of said gyroscope, yielding means for opposing said precession, a torque applying device, and means responsive to precession for accelerating the action of said torque applying device.

10. The combination with a body subject to oscillations, of a gyroscope mounted thereon so that oscillation of said body causes precession of said gyroscope, yielding means for opposing said precession, a torque applying device, means responsive to an initial precession for accelerating the action, and to a further precession for retarding the action of said device.

11. The combination with a ship, of means for exerting periodic rolling torques thereon, and means responsive to the velocity of roll for governing the action of said other means.

12. The combination with a ship, of means for exerting periodic rolling torques thereon, and means responsive to the direction and velocity of roll for governing the action of said other means.

13. The combination with a ship, of a gyroscope mounted therein for exerting torques thereon, power means for applying periodic torques on said gyroscope and means responsive to the velocity of roll for controlling said power means.

14. In a gyroscopic apparatus for oscillatory bodies, a main gyroscope mounted for precessional movements, power means for governing the precessional movements, an auxiliary gyroscope, and means responsive to precessional movements of said auxiliary gyroscope for controlling said power means.

15. In a gyroscopic apparatus for oscillatory bodies, a main gyroscope mounted for precessional movements, power means for governing the precessional movements, an auxiliary gyroscope, yielding centralizing means for said gyroscope, and means responsive to precessional movements of said auxiliary gyroscope for controlling said power means.

16. In a gyroscopic stabilizing or rolling apparatus, a main gyroscope mounted for precessional movements, power means for accelerating and retarding said precessional movements comprising a worm wheel mounted about the precessional axis, a worm meshing with said worm wheel, a motor for driving said worm, and means for governing the direction of the torques applied through the worm.

17. In a gyroscopic stabilizing or rolling apparatus, a main gyroscope mounted for precessional movements, power means for governing said precessional movements, means responsive to rolling of the ship for controlling said power means, and additional means for automatically cutting out the power means.

18. In a gyroscopic stabilizing or rolling apparatus, a main gyroscope mounted for precessional movements, power means for governing said precessional movements, means responsive to rolling of the ship for controlling said power means, and additional means responsive to the heeling of the ship for automatically cutting out the power means.

19. In a gyroscopic stabilizing or rolling apparatus, a main gyroscope mounted for precessional movements, power means for governing said precessional movements, means responsive to rolling of the ship, for controlling said power means, and additional means for automatically cutting out the power means and applying a brake about said precession axis.

20. The combination with an oscillatory mass, of a stabilizing or rolling gyroscope therefor, a precession engine for controlling the precession of the gyroscope, an auxiliary gyroscope, means controlled by the initial precession of said auxiliary gyroscope for governing said precession engine, and braking means for the stabilizing gyroscope controlled by a further precession of said auxiliary gyroscope.

21. The combination with an oscillatory mass, of a gyroscope therefor, a precession engine for governing the precession of the gyroscope, and means for controlling said engine, comprising a controller operated by the oscillating movement of the mass, and means for confining the operation of said controller to the periods during which the mass is in or near its normal position.

22. The combination with an oscillatory mass, of a gyroscope therefor, a precession engine for governing the precession of the gyroscope, and means for controlling said engine, comprising a controller operated by the oscillating movement of the mass, and means for confining the operation of said controller to the periods of maximum angular velocity of the mass.

23. The combination with an oscillatory mass, of a gyroscope therefor, a precession engine for governing the precession of the gyroscope, and means for controlling said engine, comprising a controller operated by the oscillating movement of the mass, and means for confining the operation of said precession engine to a predetermined period in each cycle of operation.

24. The combination with an oscillatory mass, of a gyroscope therefor, a precession engine for governing the precession of the gyroscope, and means for controlling said engine, comprising a controller operated by the oscillating movement of the mass, means for confining the operation of said precession engine to a predetermined period in each cycle of operation, and means responsive to the amplitude of the rolling for varying the length of said period.

25. In a gyroscopic stabilizing or rolling apparatus, a main gyroscope mounted for precessional movements, power means for governing said precessional movements comprising a worm wheel mounted about the precessional axis, a worm meshing with said worm wheel, a motor for driving said worm, and means for confining the effective operation of said motor to a predetermined period in each cycle, whereby, during the remaining period of each cycle, precession of the gyroscope is prevented.

26. The combination with an oscillatory body, of a gyroscope mounted thereon for precession relative thereto, a precession engine for controlling said precession, a normally inoperative brake adapted to brake the gyroscope about its precession axis, and automatic means for cutting out the action of said engine and applying said brake upon a predetermined event.

27. The combination with an oscillatory body, of a plurality of gyroscopes mounted thereon for precession relative thereto, an electrically controlled brake for braking the precession of a gyroscope, and a switch adapted to be actuated by precession of a gyroscope for causing said brake to be applied.

28. The combination with an oscillatory body, of a plurality of gyroscopes mounted thereon for precession relative thereto, a brake for opposing precession of a gyroscope, and means responsive to the precession of another of said gyroscopes for causing said brake to be applied.

29. The combination with an oscillatory body, of a plurality of gyroscopes mounted thereon for precession relative thereto, a precession engine and a brake for governing the precession of a portion of the gyroscopes, means responsive to the precession of another of the gyroscopes for operating said engine and means responsive to precession of a gyroscope for applying said brake.

30. The combination with an oscillatory body, of a plurality of gyroscopes mounted thereon for precession relative thereto, a precession engine and a brake for governing the precession of a portion of the gyroscopes, means responsive to the initial precession of another of the gyroscopes for operating said engine and means responsive to a further precession of said other gyroscopes for applying said brake.

In testimony whereof I have signed my name to this specification in the presence of two subscribing witnesses, this 5th day of January, 1915.

ELMER A. SPERRY.

Witnesses:
HARRY L. TANNER,
OTTO MIETZELFELD.